United States Patent [19] [11] 4,199,646
Hori et al. [45] Apr. 22, 1980

[54] HEAT-ACTIVATABLE, PRESSURE-SENSITIVE ADHESIVE TAPE OR SHEET

[75] Inventors: Yutaka Hori; Makoto Sunagawa; Naoki Matsuoka, all of Osaka, Japan

[73] Assignee: Nitto Electric Industrial Co., Ltd., Ibaragi, Japan

[21] Appl. No.: 932,157

[22] Filed: Aug. 9, 1978

[51] Int. Cl.$^2$ .............................................. C08L 33/14
[52] U.S. Cl. ................. 428/344; 260/27 R; 260/42.18; 260/42.21; 260/42.28; 260/42.29; 428/355; 428/460; 428/463; 428/497; 428/498; 428/514; 428/515; 428/522; 525/107; 525/118; 525/119; 525/132; 525/143; 525/156; 525/193; 525/218; 525/223
[58] Field of Search ............... 428/463, 514, 522, 460, 428/497, 498, 344, 355; 260/901, 844, 836, 27 R

[56] References Cited

U.S. PATENT DOCUMENTS

| | | | |
|---|---|---|---|
| 3,245,925 | 4/1966 | Watson | 260/20 |
| 3,299,010 | 1/1967 | Samour | 260/78 |
| 3,919,351 | 11/1975 | Chang et al. | 260/850 |
| 4,077,926 | 3/1978 | Sanderson et al. | 260/29.67 A |

*Primary Examiner*—Carman J. Seccuro
*Attorney, Agent, or Firm*—Sughrue, Rothwell, Mion, Zinn and Macpeak

[57] ABSTRACT

A heat-activatable, pressure-sensitive adhesive tape or sheet in which the pressure-sensitive, bonding function arises on heating, which comprises a backing material having thereon a layer of a heat-activatable, pressure-sensitve adhesive having an apparent modulus of elasticity of about 10 to 300 kg/cm$^2$ at normal temperature, the adhesive comprising a mixture of (a) 100 parts by weight of a copolymer of (i) an alkyl acrylate ester or an alkyl methacrylate ester and (ii) a polymerizable monomer having a functional group, and
(b) about 50 to 200 parts by weight of a reactive hot-melt resin that is miscible with the copolymer (a), has a melting point of about 60° C. or higher, and has at least one functional group capable of reacting with the functional group of the copolymer (a), either directly or through a crosslinking agent.

17 Claims, No Drawings

HEAT-ACTIVATABLE, PRESSURE-SENSITIVE ADHESIVE TAPE OR SHEET

BACKGROUND OF THE INVENTION

1. Field of the Invention

This invention relates to a novel heat-activatable, pressure-sensitive adhesive tape or sheet (film) which in the normal state has a low stickiness to the touch and thus is poorly bonded to an object, but, upon heating for a short time at a relatively low temperature of at about 50° C. or above, exhibits excellent bond strength since the adhesive reacts on heating and is activated to have a viscosity providing a modulus of elasticity equal to that possessed by known pressure-sensitive adhesives at normal temperature.

2. Description of the Prior Art

A pressure-sensitive adhesive tape comprising a support tape coated with a pressure-sensitive adhesive can be bonded to an object at normal temperature and at a pressure substantially equal to the finger pressure. This type of tape is useful in the protection and ornamentation of objects or in fixing the ends of a wrapping paper. However, if the adhesive layer is continuously subjected to various stresses, flow occurs within the adhesive layer to cause frequent peeling of the adhesive tape from the object. In addition, such flow is more likely to occur under conditions where the tape is exposed to heat and/or moisture. Therefore, the use of a conventional pressure-sensitive adhesive tape has been limited.

The two main types of adhesive tapes that have been developed as an adhesive tape material in which the fluidity of the adhesive after bonding is reduced to a minimum are a thermo-setting adhesive tape material in which a chemical cross-linking reaction is induced, and a heat-activatable adhesive tape material which solidifies after the adhesive is activated by heating. However, to cure the first type of adhesive tape, the adhesive tape must be heated to a temperature higher than 100° C. with a heater that is expensive and the operations required are complicated. In addition, the use of such a tape is limited in that it can be applied to only a heat resistant adherend. The second type of adhesive tape includes a rubber-based heat-activatable adhesive which comprises a mixture of a rubber such as neoprene rubber, nitrile rubber, styrene-butadiene rubber, or natural rubber with a suitable amount of a hydrogenated rosin, a phenolic resin, a polyterpenic resin, etc., and a resin-based heat-activatable adhesive which mainly comprises polyethylene, an ethylene/vinyl acetate copolymer, a polyamide resin, etc. Since the rubber-based adhesive uses a rubber-like elastomer as the main component, the adhesive has low temperature sensitivity and high heat resistance, but when activated upon heating, the adhesive has high melt viscosity and poor "wetting" characteristics and, therefore, it has low bond strength if the surface of the adherend is not smooth. Such defects of the rubber-based adhesive can be overcome with a resin-based adhesive, but the inherent nature of this type of adhesive is that the melt viscosity of the adhesive becomes too low if it is activated by heating. For this reason, the bond strength of this adhesive is markedly reduced upon intermittent or continuous exposure of the bonded adherend to high temperatures (higher than the application temperature).

SUMMARY OF THE INVENTION

Therefore, a first object of this invention is to provide an adhesive tape having a layer of a heat-activatable, pressure-sensitive adhesive which senses the heat generated by heating to a relatively low temperature and is activated to have a viscosity such that the adhesive exhibits sufficient wetting to even an adherend whose surface is not smooth.

A second object of this invention is to provide an adhesive tape which is capable of bonding an adherend upon being activated by heating and yet which has high peel resistance and bond strength even upon exposure to heat after solidification.

A third object of this invention is to provide an adhesive tape which exhibits a bond strength substantially equal to or higher than that provided by a conventional pressure-sensitive adhesive even upon exposure to a temperature ranging from about 60° to 100° C.

As a result of various studies on an adhesive tape having a layer of adhesive that is activated at a relatively low temperature for adhesion to an adherend and which retains high bond strength after solidification even if the tape is intermittently or continuously exposed to the temperature required for the activation or a slightly higher temperature, an adhesive tape having a layer of a heat-activatable, pressure-sensitive adhesive that provides the above-described characteristics has been discovered by compounding an acrylic copolymer composition containing a polymerizable monomer having a functional group with a reactive hot-melt resin in a specific proportion and with the compound having certain physical properties.

That is, this invention provides a heat-activatable, pressure-sensitive adhesive tape or sheet in which the pressure-sensitive, bonding function arises upon heating and which comprises a backing material having thereon a layer of a heat-activatable, pressure-sensitive adhesive having an apparent modulus of elasticity of about 10 to 300 kg/cm$^2$ at normal temperature, which adhesive comprises a mixture of (a) 100 parts by weight of a copolymer of (i) an alkyl acrylate ester or an alkyl methacrylate ester and (ii) a polymerizable monomer having a functional group, and (b) about 50 to 200 parts by weight of a reactive hot-melt resin that is highly miscible with the copolymer (a), has a melting point of about 60° C. or higher, and has at least one functional group capable of reacting with the functional group of the copolymer (a), either directly or through a cross-linking agent.

DETAILED DESCRIPTION OF THE INVENTION

As set forth above, one feature of this invention is to mix an acrylic copolymer (a) containing a polymerizable monomer having a functional group with a reactive hot-melt resin (b) to obtain an adhesive that is substantially nonviscous and has a high apparent modulus of elasticity at normal temperature but which has excellent bond strength at high temperatures.

Another feature of this invention is that only a small amount of heat is required for activation of the adhesive.

The heat-activatable, pressure-sensitive adhesive tape or sheet of this invention, placed on an adherend or interposed between adherends, exhibits excellent bond strength simply upon heating at a relatively low temperature (e.g., about 60° to 120° C.), optionally under pressure, and retains satisfactorily high bond strength after solidification even if the tape is exposed to the temperature required for the heat activation (optionally under pressure) or to a higher temperature.

The alkyl(meth)acrylate ester of the copolymer (a) used in this invention is a component that provides the heat-activatable, pressure-sensitive adhesive with a desired tackiness and adhesion properties. Suitable alkyl(meth)acrylate esters which can be used are those in which the alkyl group can be straight chain, branched chain or cyclic and has 10 or less carbon atoms. Specific examples of suitable alkyl(meth)acrylate esters are butyl acrylate, butyl methacrylate, methyl acrylate, methyl methacrylate, ethyl acrylate, ethyl methacrylate, 2-ethylhexyl acrylate, octyl acrylate, cyclohexyl acrylate, etc. These alkyl(meth)acrylate esters can be used individually or as a mixture thereof or in the presence of a suitable amount of vinyl monomers copolymerizable therewith such as styrene, vinyl acetate, acrylonitrile, methacrylonitrile, etc. A suitable amount of the vinyl monomer copolymerizable with the alkyl(meth)acrylate ester is about 100 parts by weight or less per 100 parts by weight of the alkyl(meth)acrylate ester.

Preferred examples of suitable polymerizable monomers having a functional group capable of copolymerizing with the above-described alkyl(meth)acrylate esters to form a copolymer (a) that serves as the matrix of the heat-activatable, pressure-sensitive adhesive used in this invention are as follows:

(a) a polymerizable monomer having a carboxyl group, such as acrylic acid, methacrylic acid, crotonic acid, itaconic acid, maleic acid, maleic anhydride, etc.;

(b) a polymerizable monomer having a hydroxyl group, such as hydroxyethyl acrylate, hydroxyethyl methacrylate, hydroxypropyl acrylate, hydroxypropyl methacrylate, etc.;

(c) a polymerizable monomer having a glycidyl group, such as glycidyl acrylate, glycidyl methacrylate, acryl glycidyl ether, etc.;

(d) a polymerizable monomer having a methylol group, such as N-methylol acrylamide, N-methylol methacrylamide, etc.

The above-described alkyl(meth)acrylate esters and the polymerizable monomers having a functional group are polymerized in a conventional manner, for example, solution polymerization to prepare a copolymer (a) having an average molecular weight of about 50,000 or higher, preferably about 100,000 to 700,000.

The reactive hot-melt resin (b) used in this invention is a component that provides the heat-activatable, pressure-sensitive adhesive with a desired degree of bond strength retention and apparent modulus of elasticity at normal temperature. Suitable reactive hot-melt resins (b) which can be used in this invention have a melting point of about 60° to about 200° C., preferably about 65° to about 150° C., and a mean molecular weight of about 500 to about 2,000, preferably about 700 to bout 1,500. Further, the hot-melt resin (b) is a reactive resin that is miscible with the above-described copolymer (a) and also has at least one functional group reactive with the functional group of the copolymer (a), either directly or through a cross-linking agent. Representative examples of functional groups present in hot-melt resin (b) which are reactive with the functional group of the copolymer (a), either directly or through a cross-linking agent, include a methylol group, an epoxy group, a carboxyl group, an amino group, a hydroxy group and the like.

The miscibility of the reactive hot-melt resin (b) and the copolymer (a) can be evaluated as follows. The copolymer (a) and the reactive hot-melt resin (b) in a weight ratio of 1:1 are uniformly dissolved in a solvent for both. The resulting solution is coated uniformly on a linear sheet and dried. The liner sheet is peeled off to a copolymer/hot-melt resin film having a thickness of 50μ. If the hot-melt resin (b) is highly miscible with the copolymer (a), a transparent film is obtained. On the other hand, if the miscibility between the hot-melt resin (b) and the copolymer (a) is poor, an opaque (whitened) film is obtained. The miscibility between the hot-melt resin (b) and the copolymer (a) can be examined by measuring the transmittance of light of the copolymer (a)/hot-melt resin (b) film according to ASTM D-1003. A suitable miscibility for the purposes of this invention between the hot-melt resin (b) and the copolymer (a) is a light transmittance of at least about 50%.

Examples of reactive hot-melt resins (b) having at least one functional group directly reactive with the functional group of the copolymer (a) described above are epoxy resins (where the functional group is an epoxy group), phenolic resole or novolac resins (where the functional group is a methylol group or a hydroxy group), xylene resins (where the functional group is a methylol group), rosins (where the functional group is a carboxyl group), etc. Examples of reactive hot-melt resins (b) having at least one functional group reactive with the functional group of the copolymer (a) through a crosslinking agent such as a polyisocyanate, a polyamine, melamine, etc., are xylene resins, rosin resins, etc., or resins so modified as to have a functional group, such as phenolic novolac or resole resins, rosin-modified phenolic resins, terpene-modified phenolic resins, maleic anhydride-modified petroleum resins.

Preferred examples of epoxy resins which can be used in this invention are epoxy resins having a mean molecular weight of about 800 to about 4,000, a softening point of about 60° to about 160° C. and an epoxy equivalent of about 400 to about 3,000. Representative examples of epoxy resins which can be used are Epikote #1001, Epikote #1004, Epikote #1007, and Epikote #1009 (trademarks, produced by Shell International Chemical Corp.). The epoxy resins have an epoxy group as a functional group.

Preferred examples of phenolic resins which can be used in this invention are the condensation products of a p-alkylphenol and formaldehyde having a mean molecular weight of about 600 to about 1,200, a softening point of about 70° to about 140° C. and an acid value of about 50. A representative example of phenolic resins which can be used is Amberol 137X (trademark, produced by Rohm & Haas Co.).

Preferred examples of xylene resins which can be used in this invention are xylene resins having a mean molecular weight of about 700 to about 1,500, a softening point of about 70° to about 150° C. and an acid value of about 20. Representative examples of xylene resins which can be used are Nikanol HP-100 and Nikanol HP-120 (trademarks, produced by Mitsubishi Gas Chemical Co.).

Preferred examples of rosins which can be used in this invention are gum rosins, wood rosins, hydrogenated rosins, polymerized rosins and the like. Representative examples of rosins which can be used are Dymerex Rosin (softening point 137° C.) and Staybelite Rosin (softening point 70° C.) (trademarks, both produced by Hercules Co.).

As cross-linking agents, isocyanates, such as methanediphenyl diisocynate, toluene diisocyanate, polyaromatic polyisocyanates, polyether polyisocyanates (mean molecular weight: about 700–5,000), polyester polyisocyanates (mean molecular weight: about 700–5,000), Desmodur L (trademark for a reaction product of 1 mol of trimethylol propane and 3 mols of toluene diisocyanate, produced by Bayer AG), etc., polyamines, such as diethylene triamine, triethylene tetramine, N-aminoethyl piperadine, diaminophenyl methane, metaphenylene diamine, polyamide resins having an amine value of about 200 to 400, etc., melamines such as trimethylol melamine, hexamethylol melamine, alkylated methylol melamines (e.g., methylmethylol melamine, ethylmethylol melamine or butylmethylol melamine), etc. can be used.

The proportion at which these reactive hot-melt resins (b) are compounded with the copolymers (a) described above will vary depending on the melting point, the molecular weight, the melt viscosity and the properties at normal temperatures of the hot-melt resins (b), but for the purpose of this invention, 100 parts by weight of the copolymer (a) is compounded with about 50 to 200 parts by weight, preferably 70 to 150 parts by weight, of the reactive hot-melt resin (b) so as to provide a heat-activatable, pressure-sensitive adhesive having an apparent modulus of elasticity of about 10 to 300 kg/cm$^2$, preferably 15 to 100 kg/cm$^2$, at normal temperature. If less than about 50 parts by weight of the hot-melt resin (b) is used, the adhesive obtained has such a low apparent modulus of elasticity upon heating that the adhesive strength under shear of the adhesive is not sufficiently high and, in addition, due to the slow rate of solidification that follows the melting, the adhesive must be kept stationary for a certain period of time under pressure. If more than about 200 parts by weight of the hot-melt resin (b) is used, the adhesive obtained has such a high apparent modulus of elasticity upon heating that the wetting of the adherend by the adhesive and, therefore, the peel strength of the adhesive, is not sufficiently high. Further, a large amount of heat is required for activation of the adhesive.

If the adhesive obtained has an apparent modulus of elasticity of less than about 10 kg/cm$^2$ at normal temperature, and if the adhesive is continuously subjected to various stresses under high temperature, flow occurs inside the adhesive layer which may then result in the adhesive tape peeling off the adherend. If the apparent modulus of elasticity at normal temperature is higher than about 300 kg/cm$^2$, not only is a large amount of heat required for activating the adhesive but, due to the low impact resistance of the adhesive, the adherend may easily be peeled off by an external impact.

In addition to the cross-linking agents described above, the following addenda may optionally be mixed with the compound of the copolymer (a) and the reactive hot-melt resin (b). For example, a reaction catalyst such as a metal salt, an inorganic acid, an organic acid, a tertiary amine, cresol, etc.; a non-reactive resin, such as a cumarone-indene resin, an aromatic petroleum resin, a terpene resin, a styrene resin and an aliphatic hydrocarbon resin, which does not have any functional group reactive with the functional group of the copolymer (a) in the presence of a cross-linking agent; a colorant; and a filler, etc.

Suitable reaction catalysts which can be used are selected depending upon the combination of the functional groups of the copolymer (a) and that of the hot-melt resin (b) and also the types of cross-linking agent used (if any). For example, where the hot-melt resin (b) is an epoxy resin, representative examples of reaction catalysts which can be used are trimethylamine, a cresol, sodium hydroxide, etc., and where an isocyanate is used as a cross-linking agent, representative examples of reaction catalysts which can be used are dibutyl tin dilaurate, an alcoholate, triethylamine, etc.

About 0.1 to 20 parts by weight of the cross-linking agent or the reaction catalyst may be used per 100 parts by weight of the copolymer (a) and about 5 to 100 parts by weight of the non-reactive resin may be used per 100 parts of the copolymer (a).

Representative examples of colorants which can be used are carbon, pigments such as titanium white (TiO$_2$), etc. A colorant is generally used in an amount of about 0.5 to about 5 parts by weight per 100 parts by weight of the copolymer (a).

Representative examples of fillers which can be used are calcium carbonate, silica powder, glass fibers, etc. A filler is generally used in an amount of about 1 to about 50 parts by weight per 100 parts by weight of the copolymer (a).

The heat-activatable, pressure-sensitive adhesive mainly comprising the copolymer (a) and the reactive hot-melt resin (b) is applied to a backing material to form the heat-activatable, pressure-sensitive adhesive tape or sheet of this invention. The manner in which the adhesive is superimposed on the backing material is determined by the use of the adhesive tape or sheet prepared. If the tape or sheet when used is to be interposed between two objects (between a hard plate such as a metal nameplate, a display panel or other plates and the surface of a machine or apparatus; between a plywood laminate and an overlay sheet) to fix the two objects, a liner sheet which has a synthetic resin with a low degree of adhesivity such as a silicone polymer baked on the outermost surface is peelably superimposed on the heat-activatable, pressure-sensitive adhesive layer. If the backing material of the adhesive tape or sheet when used is to be employed in various applications such as protection, corrosion control, display, decoration, reinforcement, retention or tying of an adherend, the backing material is tightly superimposed on the adhesive. Therefore, a suitable backing material is selected depending on the purpose of use of the adhesive tape or sheet. For example, a plastic film or sheet, a metal foil, a synthetic paper, a paper, a non-woven fabric, a woven fabric, a rubber sheet, etc., may be used to achieve the purpose described above.

For the purpose of reinforcement, cushioning and increased thickness, a thin core material having high tensile strength, such as a non-woven fabric of which a rayon non-woven fabric or a polyamide non-woven fabric is representative, or a fabric of which a typical example is a sheer scrim can be embedded in the adhesive layer. A core material embedded in the adhesive layer is particularly effective if the adhesive is superimposed on the liner sheet described above. This provides the adhesive layer with self-supporting property and adequate body.

The heat-activatable, pressure-sensitive adhesive tape or sheet of this invention can be prepared without using any special manufacturing apparatus or means. In the preparation of the heat-activatable, pressure-sensitive adhesive tape or sheet of this invention, the copolymer (a) described above can be mixed with the reactive hot-melt resin (b), optionally in the presence of a crosslinking agent, a reaction catalyst or a non-reactive resin to produce a heat-activatable, pressure-sensitive adhesive composition, which is then either extruded from an extruder or passed through calender rolls and laminated onto the backing material. Alternatively, the copolymer (a) can be dissolved or dispersed in a medium such as an organic solvent, such as aromatic solvents, e.g., benzene, toluene or xylene; ketones, e.g., acetone or methyl ethyl ketone; aliphatic solvents, e.g., hexane or heptane; halogenated compounds, e.g., chlorobenzene or carbon tetrachloride; etc., or water, and the reactive hot-melt resin (b) and other components are added to form a uniform mixture, which is then either directly coated or transfer coated onto the backing material to form an adhesive tape or sheet.

The term "apparent modulus of elasticity at normal temperature (about 20° C.)" as used herein means the tangent modulus determined by stretching a sample of the heat-activatable, pressure-sensitive adhesive at a rate of 300 mm/min (between chuck distance of 50 mm) under the conditions of 20° C.×65% R.H. The formula for calculating the apparent modulus of elasticity at normal temperature is set forth below:

Modulus of Elasticity = F/S

F: the force (kg/cm$^2$) at the intersection of the line along which the sample has been stretched 100% and the tangent line
S: the cross-sectional area of the sample The modulus of elasticity of typical commercial pressure-sensitive adhesive tapes was calculated from this formula. The results were 0.5 to 2 kg/cm$^2$ for a cellophane tape; 0.5 to 1 kg/cm$^2$ for a vinyl tape; and 1 to 5 kg/cm$^2$ for a double-coated adhesive tape.

This invention is described in greater detail by reference to the following examples. However, the present invention is not to be construed as being limited to these examples. Unless otherwise stated, all parts are by weight.

EXAMPLE 1

A mixture of butyl acrylate, acrylic acid and vinyl acetate (in a weight ratio of 7.0:0.1:2.9) was subjected to solution polymerization (in toluene; monomer concentration: 40%) so as to prepare a solution of a copolymer having an average molecular weight of about 150,000.

To 100 parts, based on the solids content, of the solution were added 100 parts of Epikote #1004 (trademark for an epoxy resin produced by Shell International Chemical Corp.; softening point: 100° C.; mean molecular weight: 1,400; epoxy equivalent: 950) and 1 part of cresol to prepare a heat-activatable, pressure-sensitive adhesive mixture in the form of a solution. The solution was coated onto a 50μ thick polyester film, the surface of which had been treated with a silicone, so that the coated thickness after drying would be about 50μ, and then dried at 100° C. for 3 minutes to produce a heat-activatable, pressure-sensitive adhesive tape of this invention. The adhesive layer of the tape had an apparent modulus of elasticity of about 35 kg/cm$^2$ as measured according to the method defined hereinabove.

The bond strength against peeling at normal temperature of the tape was evaluated by varying the temperature at which the tape was applied to an adherend. Samples of the tape were applied at 100 g/cm$^2$ to each of four aluminum sheets (finished with a #280 sand blast) heated to 20° C., 50° C., 80° C. and 100° C., respectively, and the thus-prepared samples were subjected to a shearing test at room temperature using a Schopper tensile tester (shear rate: 50 mm/min; 20° C.×65% R.H.). The values obtained were 10.3 kg/cm$^2$, 20.8 kg/cm$^2$, 24.4 kg/cm$^2$ and 33.5 kg/cm$^2$, respectively, for the samples bonded at 20° C., 50° C., 80° C. and 100° C. onto the aluminum sheets.

The bond strength against peeling under heating after application of the tape was then evaluated. Samples were prepared by applying samples of the tape at 100 g/cm$^2$ to an aluminum sheet (finished with a #280 sand blast) preheated to 80° C. and then allowing the samples to cool to room temperature. The samples thus-prepared were held at 20° C., 40° C., 80° C. and 100° C., respectively, allowed to stand for 2 hours in a constant temperature chamber, where they were subjected to a shearing test using a Schopper tensile tester under the conditions specified above. The values obtained were 33.5 kg/cm$^2$, 19.5 kg/cm$^2$, 3.8 kg/cm$^2$ and 3.4 kg/cm$^2$ for the samples exposed at 20° C., 40° C., 80° C. and 100° C., respectively.

EXAMPLE 2

A mixture of 2-ethylhexyl acrylate, methyl methacrylate and acrylic acid (in a weight ratio of 8:1:1) was subjected to solution polymerization (in toluene; monomer concentration: 45%) so as to prepare a solution of a copolymer having an average molecular weight of about 100,000.

To 100 parts, based on the solids content, of the solution were added 150 parts of Epikote #1001 (trademark for an epoxy resin produced by Shell International Chemical Corp.; softening point: 70° C.; mean molecular weight: 900; epoxy equivalent: 500) and 2 parts of polymethylene polyphenyl diisocyanate to prepare a heat-activatable, pressure-sensitive adhesive mixture in the form of a solution. The solution was coated onto a 50μ thick polyester film, the surface of which had been treated with a silicone, so that the coated thickness after drying would be about 50μ, and then dried at 70° C. for 5 minutes to produce a heat-activatable, pressure-sensitive adhesive tape or sheet of this invention.

The adhesive layer had an apparent modulus of elasticity at normal temperature of about 53 kg/cm$^2$. The bond strengths against shearing at normal temperature were 5.0 kg/cm$^2$, 20.5 kg/cm$^2$, 28.5 kg/cm$^2$ and 30.0 kg/cm$^2$ for samples where the tape had been applied to an aluminum sheet at 20° C., 50° C., 80° C. and 100° C., respectively. The bond strengths against shearing under heating were 28.5 kg/cm$^2$, 16.5 kg/cm$^2$, 3.5 kg/cm$^2$ and 3.0 kg/cm$^2$ for samples which were exposed to a temperature of 20° C., 40° C., 80° C. and 100° C., respectively, in a constant temperature chamber.

EXAMPLE 3

A mixture of ethyl acrylate, butyl acrylate and 2-hydroxyethyl acrylate (in a weight ratio of 3:6.9:0.1) was subjected to solution polymerization (in toluene; monomer concentration: 35%) so as to prepare a solution of a copolymer having an average molecular weight of about 300,000.

To 100 parts, based on the solids content, of the solution were added 100 parts of YS-Polyester #100 (trade name for an α-pinene modified phenolic resin, produced by Yasuhara Jushi K. K.; mean molecular weight: about 800; melting point: 100° C.) and 2 parts of polymethylene polyphenylisocyanate (molecular weight: about 380) to prepare a heat-activatable, pressure-sensitive adhesive, which was then treated in the same manner as described in Example 2 to thereby produce a heat-activatable, pressure-sensitive tape or sheet of this invention.

The adhesive layer had an apparent modulus of elasticity at normal temperature of about 62 kg/cm$^2$. The bond strengths against shearing at normal temperature were 8.3 kg/cm$^2$, 19.5 kg/cm$^2$, 29.3 kg/cm$^2$ and 35.5 kg/cm$^2$ for samples where the tape had been applied to an aluminum sheet at 20° C., 50° C., 80° C. and 100° C., respectively. The bond strengths against shearing under heating were 29.3 kg/cm$^2$, 18.3 kg/cm$^2$, 4.5 kg/cm$^2$ and 2.9 kg/cm$^2$ for samples which were exposed to a temperature of 20° C., 40° C., 80° C. and 100° C., respectively, in a constant temperature chamber.

EXAMPLE 4

A mixture of octadecyl acrylate and methylol acrylamide (in a weight ratio of 9:1) was subjected to solution polymerization (in toluene; monomer concentration: 25%) so as to prepare a solution of a copolymer having an average molecular weight of about 500,000.

To 100 parts, based on the solids content, of the solution were added 60 parts of Nikanol HP-100 (trade name for a xylene resin, manufactured by Mitsubishi Gas Chemical Co.; softening point: 120° C.; mean molecular weight: 1,000; acid value: 30 or less), 2 parts of trimethylol melamine (trimethylol melamine methyl ether) and 0.5 part of stannic chloride to prepare a heat-activatable, pressure-sensitive adhesive mixture, which was coated onto a crepe paper (basis weight: 80 g/m$^2$) so that the coated thickness after drying would be about 50μ, and then dried at 100° C. for 3 minutes to produce a heat-activatable, pressure-sensitive adhesive tape or sheet of this invention.

The adhesive layer had an apparent modulus of elasticity at normal temperature of about 32 kg/cm$^2$. The bond strengths against shearing at normal temperature were 6.7 kg/cm$^2$, 10.5 kg/cm$^2$, 23.4 kg/cm$^2$ and 28.0 kg/cm$^2$ for samples where the tape had been applied to an aluminum sheet at 20° C., 50° C., 80° C. and 100° C., respectively. The bond strengths against shearing under heating were 23.4 kg/cm$^2$, 19.3 kg/cm$^2$, 6.1 kg/cm$^2$ and 3.3 kg/cm$^2$ for samples which were exposed to a temperature of 20° C., 40° C., 80° C. and 100° C., respectively, in a constant temperature chamber.

EXAMPLE 5

A mixture of 2-ethylhexyl acrylate and maleic anhydride (in a weight ratio of 9:1) was subjected to solution polymerization (in toluene; monomer concentration: 50%) so as to prepare a solution of a copolymer having an average molecular weight of about 100,000.

To 100 parts, based on the solids content, of the solution were added 10 parts of a reaction product of trimethylol propane and hexamethylene diisocyanate and varying amounts of a p-tert-butyl phenol resin (softening point: 70° C.; mean molecular weight: about 100; acid value: (45) as designated by A, B, C and D in Table 1, so as to prepare a heat-activatable, pressure-sensitive adhesive mixture. The mixture was coated onto a 50μ thick polyester film, the surface of which had been treated with a silicone, in such a manner that the coated thickness after drying would be about 50μ, and then dried at 100° C. for 3 minutes to produce a heat-activatable, pressure-sensitive adhesive tape or sheet of this invention.

The apparent modulus of elasticity of the adhesive layer at normal temperature varied with the amount of the p-tert-butyl phenol resin used. For A: (60 parts), the apparent modulus of elasticity was about 28 kg/cm$^2$, and for B (100 parts), C (150 parts) and D (180 parts), the apparent modulus of elasticity was about 70 kg/cm$^2$, 110 kg/cm$^2$ and 180 kg/cm$^2$, respectively. Table 1 also shows the bond strengths against shearing at normal temperature of each of the tapes when the tapes were applied to an aluminum sheet at temperatures of 20° C., 60° C., 80° C., 100° C. and 120° C.

Table 1

| Parts of p-tert-Buthylphenyl Resin | (unit: kg/cm$^2$) Heating Temperature (°C.) | | | | |
| --- | --- | --- | --- | --- | --- |
| | 20 | 60 | 80 | 100 | 120 |
| A | 60 | 4.3 | 20.9 | 29.7 | 30.1 | 30.5 |
| B | 100 | 3.8 | 24.5 | 37.0 | 39.9 | 38.5 |
| C | 150 | 1.1 | 22.3 | 29.5 | 35.5 | 32.3 |
| D | 180 | 0.2 | 25.5 | 30.8 | 33.3 | 40.2 |

The results shown in these Examples above demonstrate that only a slight degree of reduction in the bond performance at elevated temperatures after solidification occurs with the heat-activatable, pressure-sensitive adhesive tape or sheet of this invention prepared by compounding a large amount of a reactive hot-melt resin with a copolymer of an alkyl(meth)acrylate ester and a vinyl compound having a functional group.

While the invention has been described in detail and with reference to specific embodiments thereof, it will be apparent to one skilled in the art that various changes and modifications can be made therein without departing from the spirit and scope thereof.

What is claimed is:

1. A heat-activable, pressure-sensitive adhesive tape or sheet which comprises a backing material having thereon a layer of heat-activatable, pressure-sensitive adhesive having an apparent modulus of elasticity of about 10 to about 300 kg/cm$^2$ at normal temperature, said adhesive comprising a mixture of
    (a) 100 parts by weight of a copolymer of (i) an alkyl acrylate ester or an alkyl methacrylate ester and (ii) a polymerizable monomer having a functional group selected from the class consisting of a carboxyl group, a hydroxyl group, a glycidyl group, or a methylol group, and
    (b) about 50 to 200 parts by weight of a reactive hot-melt resin that is miscible with said copolymer (a), has a melting point of about 60° C. or higher, and has at least one functional group reactive with the functional group of said copolymer (a), either directly or through a cross-linking agent, and selected from the class consisting of an epoxy resin, a xylene resin containing a methylol group, a rosin resin, a phenolic novolac or resole resin, a rosin-modified phenolic resin, a terpene-modified phenolic resin or a maleic anhydride-modified petroleum resin.

2. The adhesive tape or sheet of claim 1, wherein said alkyl acrylate ester and said alkyl methacrylate ester (i) comprises an ester in which the alkyl group thereof can be straight chain, branched chain or cyclic and has 10 or less carbon atoms.

3. The adhesive tape or sheet of claim 1, wherein said alkyl acrylate ester or said alkyl methacrylate ester (i) is butyl acrylate, butyl methacrylate, methyl acrylate, methyl methacrylate, ethyl acrylate, ethyl methacrylate, 2-ethylhexyl acrylate, octyl acrylate or cyclohexyl acrylate.

4. The adhesive tape or sheet of claim 1, wherein the copolymer (a) has an average molecular weight of about 50,000 or higher.

5. The adhesive tape or sheet of claim 1, wherein said reactive hot-melt resin (b) is present in amount of 70 to 150 parts by weight per 100 parts by weight of said copolymer (a).

6. The adhesive tape or sheet of claim 1, wherein said apparent modulus of elasticity is 15 to 100 kg/cm$^2$.

7. The adhesive tape or sheet of claim 1, wherein said heat-activatable, pressure-sensitive adhesive additionally contains at least one of a cross-linking agent, a reaction catalyst, a non-reactive resin, a colorant and a filler.

8. The adhesive tape or sheet of claim 1, wherein said backing material is a plastic film or sheet, a metal foil, a synthetic paper, a paper, a non-woven fabric, a woven fabric or a rubber sheet.

9. The adhesive tape or sheet of claim 1, wherein said heat-activatable, pressure-sensitive adhesive has a reinforcing material embedded therein.

10. The adhesive tape or sheet of claim 1, wherein said polymerizable monomer having a functional group is present in an amount of about 100 parts by weight or less per 100 parts by weight of said alkyl acrylate ester or alkyl methacrylate ester.

11. The adhesive tape or sheet of claim 1, wherein said functional group is a carboxyl group.

12. The adhesive tape or sheet of claim 1, wherein said functional group is a hydroxyl group.

13. The adhesive tape or sheet of claim 1, wherein said functional group is glycidyl group.

14. The adhesive tape or sheet of claim 1, wherein said functional group is a methylol group.

15. The adhesive tape or sheet of claim 1, wherein said reactive hot-melt resin is an $\alpha$-pinene modified phenolic resin.

16. The adhesive tape or sheet of claim 1, wherein said reactive hot-melt resin is an p-tertbutyl phenol resin.

17. The adhesive tape or sheet of claim 1, wherein said polymerizable monomer (ii) is acrylic acid, methacrylic acid, crotonic acid, itaconic acid, maleic acid, maleic anhydride, hydroxyethyl acrylate, hydroxyethyl methacrylate, hydroxypropyl acrylate, hydroxypropyl methacrylate, glycidyl acrylate, glycidyl methacrylate, acryl glycidyl ether, N-methylol acrylamide or N-methylol methacrylamide.

* * * * *